J. BRINKERHOFF.

BARBED-FENCES.

No. 7,830. Reissued Aug. 7, 1877.

Witnesses:

P. C. Dieterich.

Frank H. Duffy

Inventor:

Jacob Brinkerhoff

Per C. H. Watson & Co. Attorneys.

N. PETERS. PHOTO-LITHOGRAPHER, WASHINGTON, D. C.

UNITED STATES PATENT OFFICE.

JACOB BRINKERHOFF, OF AUBURN, NEW YORK.

IMPROVEMENT IN BARBED FENCES.

Specification forming part of Letters Patent No. 186,922, dated February 6, 1877; Reissue No. 7,830, dated August 7, 1877; application filed July 21, 1877.

*To all whom it may concern:*

Be it known that I, JACOB BRINKERHOFF, of Auburn, in the county of Cayuga and State of New York, have invented certain new and useful Improvements in Metallic Barbed Fences; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to metallic fences, and is simple in construction, efficient in operation, and not liable to get out of repair; and it consists in forming depressions or concavities in the material, as will be hereinafter more fully described.

Figure 1:
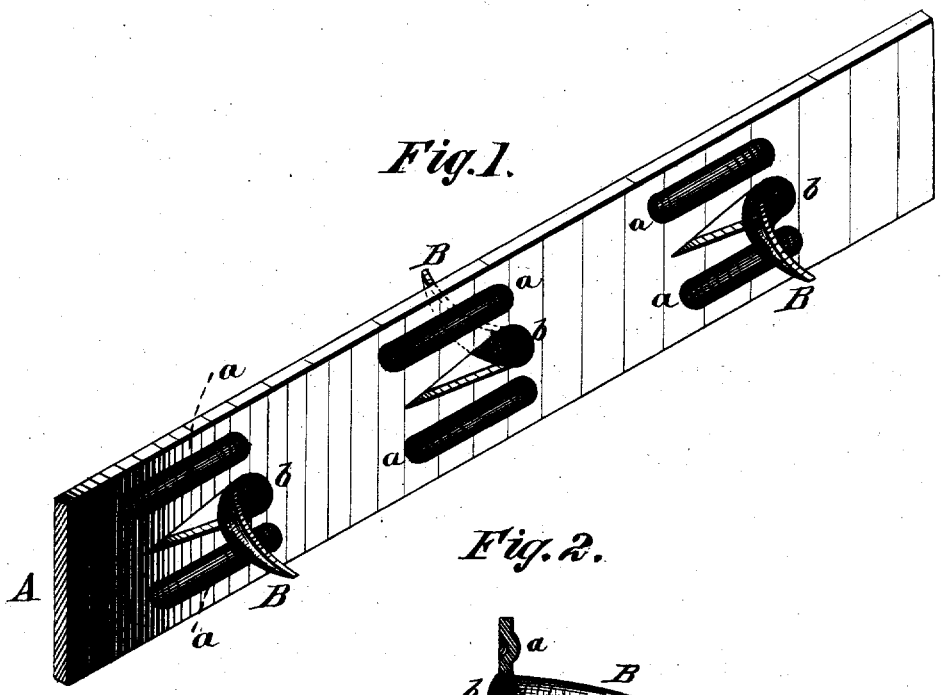
Figure 2:
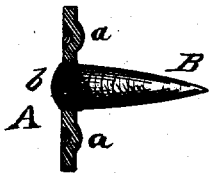
Figure 3:
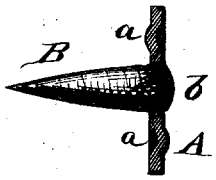

In the annexed drawings, Figure 1 represents a perspective view, and Figs. 2 and 3 represent transverse sections, of a strip or bar embodying my invention.

A represents a strip or bar to be used in fencing, provided with spurs or barbs B, cut from the inside of the outer edges of the strip or bar, and forming a part thereof. In the strip or bar A, on either side of the spurs or barbs B, I form depressions or concavities *a*, which are pressed or stamped in the material. This gives additional strength to the strip or bar, rendering it less liable to breakage, as the depressions *a* are made opposite the point from which the spurs or barbs are cut from the metal. This is essential, as the strip is weakened where the barb or spur is cut therefrom, and it is necessary to use some means by which the strip is given additional strength at or near the point from which the barbs or spurs are formed.

It has been found in practice that the spurs or barbs are liable to be broken, as, when left in a flat form, they do not possess sufficient strength.

To obviate this difficulty I make the spurs or barbs with concavities or depressions, by which means additional strength is given to the spurs or barbs without requiring an excess of metal.

To a metallic strip or bar provided with spurs or barbs cut from the material inside the edges I make no claim, broadly; but

Having thus fully described my invention, what I claim as new, and desire to secure by Letters Patent, is—

1. A flat metallic fence strip or bar, A, provided with spurs or barbs raised therefrom, said spurs or barbs having longitudinal depressions or concavities *b*, substantially as and for the purpose set forth.

2. A flat metallic strip having spurs or barbs raised therefrom, and said strip stiffened or strengthened by being provided with a concavity or depression, *a*, in the strip at or near the point from which the barb or spur is cut or raised, for the purpose set forth.

3. A metallic fence strip or bar, A, provided with spurs or barbs B, the strip or bar having the depressions *a* on each side of the spur, and the spur provided with the concavities *b*, substantially as and for the purpose set forth.

In testimony that I claim the foregoing I have hereunto set my hand this 19th day of July, 1877.

JACOB BRINKERHOFF.

Witnesses:
C. H. WATSON,
WM. P. UPPERMAN.